United States Patent
Bunyer et al.

(10) Patent No.: US 7,201,044 B1
(45) Date of Patent: Apr. 10, 2007

(54) TORQUE SENSOR INTEGRATED WITH ENGINE COMPONENTS

(75) Inventors: Scott L. Bunyer, Freeport, IL (US); Steven J. Magee, Lena, IL (US); Fred W. Hintz, Freeport, IL (US); Richard M. Andrews, Freeport, IL (US); Gary O'Brien, Riverview, MI (US); James ZT Liu, Hudson, NH (US); James D. Cook, Freeport, IL (US); Stephen R. Shiffer, Xenia, OH (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/237,360

(22) Filed: Sep. 27, 2005

(51) Int. Cl.
*G01M 15/00* (2006.01)

(52) U.S. Cl. .................................. 73/117.3

(58) Field of Classification Search ................. 73/116, 73/117.2, 117.3, 118.1, 862.041, 862.08, 73/862.09, 862.191
See application file for complete search history.

(56) References Cited

U.S. PATENT DOCUMENTS

| 4,196,337 | A |   | 4/1980  | Jewett et al. ........ 219/121 EM |
|-----------|---|---|---------|-----------------------------------|
| 4,750,371 | A |   | 6/1988  | Kobayashi et al. ...... 73/862.36 |
| 5,146,790 | A |   | 9/1992  | Fish ....................... 73/862.36 |
| 5,353,636 | A | * | 10/1994 | Sakurai et al. ............. 73/117.3 |
| 5,412,999 | A | * | 5/1995  | Vigmostad et al. .... 73/862.333 |
| 5,485,757 | A | * | 1/1996  | Foxwell ................. 73/862.321 |
| 5,686,672 | A | * | 11/1997 | Klauber et al. ......... 73/862.191 |
| 6,029,109 | A | * | 2/2000  | Rossignol et al. .......... 701/110 |
| 6,158,273 | A | * | 12/2000 | Jeremiasson et al. ...... 73/117.3 |
| 6,234,010 | B1| * | 5/2001  | Zavarehi et al. ........... 73/117.3 |
| 6,332,352 | B1| * | 12/2001 | Sano ........................ 73/117.3 |
| 6,887,178 | B2|   | 5/2005  | Miyazaki et al. ........... 475/276 |
| 6,892,533 | B2|   | 5/2005  | Beattie ....................... 60/339 |
| 6,895,828 | B2|   | 5/2005  | Nakatani et al. ....... 73/862.331 |
| 6,907,801 | B2|   | 6/2005  | Shimaguchi ................. 74/329 |
| 6,935,313 | B2| * | 8/2005  | Jacobson .................... 123/434 |
| 7,095,198 | B1| * | 8/2006  | O'Brien ..................... 318/432 |
| 2005/0022614 | A1 |   | 2/2005 | Naruse et al. ......... 73/862.326 |
| 2005/0028613 | A1 |   | 2/2005 | Onoda et al. .......... 73/862.331 |
| 2005/0103127 | A1 |   | 5/2005 | Yang ..................... 73/862.334 |
| 2005/0126309 | A1 |   | 6/2005 | Nakane et al. ......... 73/862.331 |
| 2005/0160835 | A1 |   | 7/2005 | Masaki et al. ......... 73/862.333 |
| 2005/0166685 | A1 |   | 8/2005 | Boiten ................... 73/862.191 |
| 2005/0210971 | A1 | * | 9/2005 | Satoh ....................... 73/118.1 |

OTHER PUBLICATIONS

*Torque Sensors- Surface Acoustic Wave (SAW) Sensing Technology*, Honeywell, Jan. 2005.

Gierut, J., Lohr, R., *Automotive Powertrain & Chassis Torque Sensor Technology*, Honeywell, 2005.

\* cited by examiner

*Primary Examiner*—Eric S. McCall
(74) *Attorney, Agent, or Firm*—Kermit D. Lopez; Luis M. Ortiz

(57) ABSTRACT

A torque sensor system and method. An automotive engine is located opposite a torque converter, such that a shaft extends from the engine and interacts with the torque converter. A target is located between the engine and torque converter. One or more torque sensors can be integrated with one or more position sensors for detecting a position associated with the shaft, wherein the torque sensor(s) and the position sensor(s) are integrated into a single torque sensor package to thereby provide enhanced sensing of the target in association with a rotation of shaft during an actuation of the engine.

17 Claims, 3 Drawing Sheets

TORQUE SENSOR INTEGRATED WITH ENGINE COMPONENTS

TECHNICAL FIELD

Embodiments are generally related to sensing devices and methods thereof. Embodiments are also related to torque sensors. Embodiments are additionally related to automatic transmission utilized in automobiles.

BACKGROUND OF THE INVENTION

In systems incorporating rotating drive shafts, it is often necessary to know the torque and speed of such shafts in order to control the same or other devices associated with the rotatable shafts. Accordingly, it is desirable to sense and measure the torque in an accurate, reliable, and inexpensive manner.

Sensors to measure the torque imposed on rotating shafts, such as but not limited to shafts in automotive vehicles, are utilized in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

One application of this type of torque measurement is in electric power steering systems wherein an electric motor is driven in response to the operation and/or manipulation of a vehicle steering wheel. The system then interprets the amount of torque or rotation applied to the steering wheel and its attached shaft in order to translate the information into an appropriate command for an operating means of the steerable wheels of the vehicle.

Prior methods for obtaining torque measurement in such systems have been accomplished through the use of contact-type sensors directly attached to the shaft being rotated. For example, one such type of sensor is a "strain gauge" type torque detection apparatus, in which one or more strain gauges are directly attached to the outer peripheral surface of the shaft and the applied torque is measured by detecting a change in resistance, which is caused by applied strain and is measured by a bridge circuit or other well-known means.

Another type of sensor used is a non-contact torque sensor wherein magnetorestrictive materials are disposed on rotating shafts and sensors are positioned to detect the presence of an external flux which is the result of a torque being applied to the magnetorestrictive material.

One area where torque sensing is important is in the area of automatic transmission systems. One example of an automatic transmission is disclosed in U.S. Pat. No. 6,887,178, entitled "Automatic Transmission" which issued to Miyazaki, et al. on May 3, 2005. U.S. Pat. No. 6,887,178 is incorporated herein by reference in its entirety. Another example of an automatic transmission is disclosed in U.S. Pat. No. 6,892,533, entitled "Automatic Transmission" which issued to James C. Beattie on May 17, 2005. U.S. Pat. No. 6,892,533 is incorporated herein by reference in its entirety. A further example of an automatic transmission is disclosed in U.S. Pat. No. 6,907,801, entitled "Automatic Transmission" which issued to Hiromichi Shimaguchi on Jun. 21, 2005. U.S. Pat. No. 6,907,801 is also incorporated herein by reference in its entirety.

To date, torque sensors have not been successively implemented in the context of automatic transmission systems. It is believed that if implemented properly, torque sensors have the ability to provide enhanced cam and crank shaft position sensing capabilities. The innovations disclosed herein are believed to provide for an improvement over the lack of torque sensors in automatic transmission systems and automotive engine and components thereof.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing device.

It is another aspect of the present invention to provide for an improved torque sensor.

It is yet another aspect of the present invention to provide for a torque sensor system package in which a crank shaft sensor and/or a cam shaft sensor are incorporated into the same torque sensor package as a torque sensor.

The aforementioned aspects and other objectives and advantages can now be achieved as described herein. A torque sensor system and method are disclosed. In general, an automotive engine can be located opposite a torque converter, such that a shaft extends from the engine and interacts with the torque converter. A target is located between the engine and torque converter. One or more torque sensors can be integrated with one or more position sensors for detecting a position associated with the shaft, wherein the torque sensor(s) and the position sensor(s) are integrated into a single torque sensor package to thereby provide enhanced sensing of the target in association with a rotation of shaft during an actuation of the engine.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
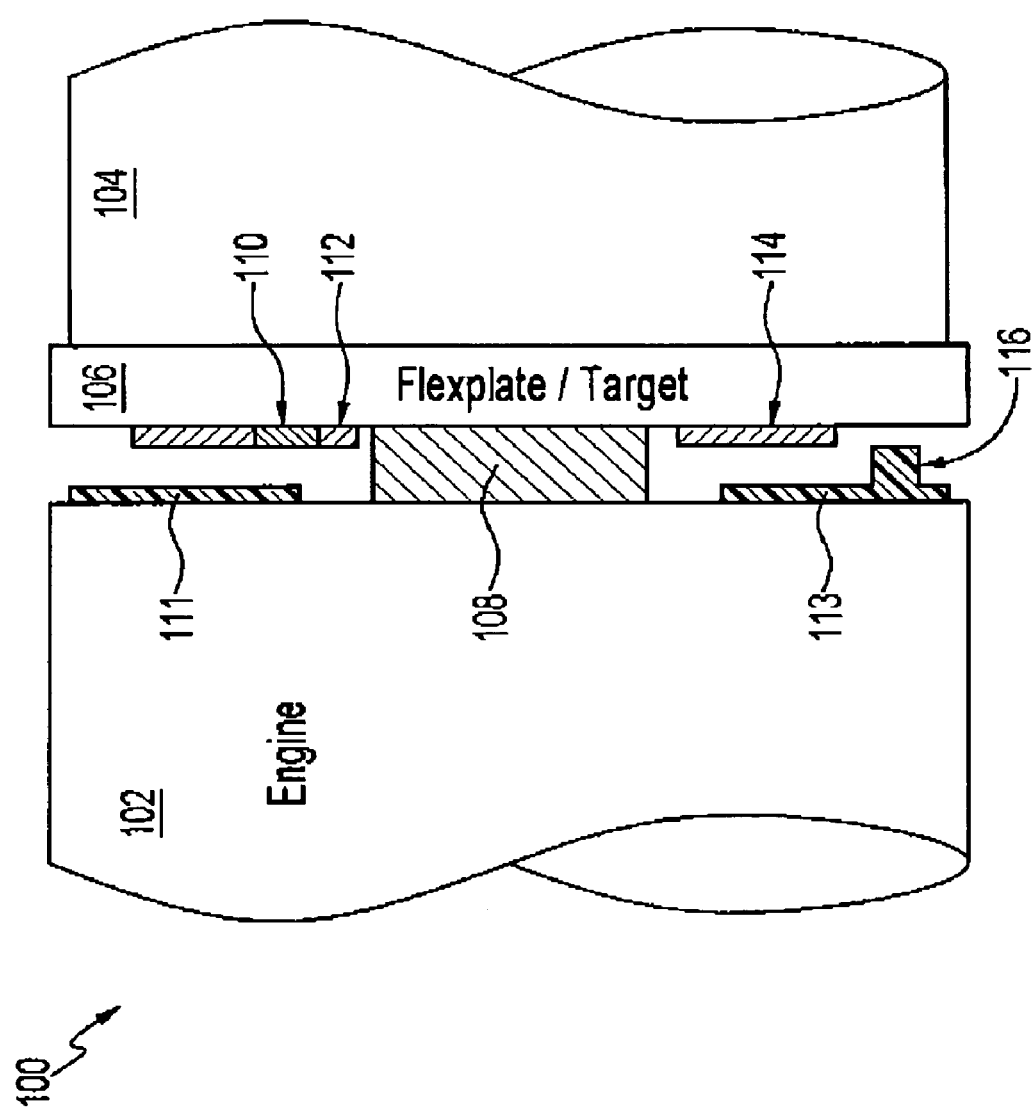
FIG. 1 illustrates a side sectional view of a torque sensor system, which can be implemented in accordance with a preferred embodiment.

FIG. 1 illustrates a side sectional view of a torque sensor system 100, which can be implemented in accordance with a preferred embodiment. Torque sensor system 100 includes an engine 102 located proximate to a transmission and torque converter 104. The end of a crank shaft 108 protrudes from engine 102 and comes into contact with a flexplate 106, which constitutes a target in the context of torque sensor system 100. Two torque rotating coupler portions 112 and 114 are also connected to the flexplate/target 106. Crank shaft 108 generally functions as a component of engine 102 that transforms the up and down movement of a piston (not shown in FIG. 1) into a rotative movement. Note that engine 102 is preferably implemented as an engine block in the context of an automatic automobile transmission.

The transmission and torque converter 104 has the ability to multiple torque from engine 102. The torque converter 104 can be connected to a transmission/transaxle input shaft, and can be utilized to connect, multiply and interrupt the flow of engine torque into the transmission associated with engine 102. The torque converter 104 can supply torque to the transmission's input shaft in two separate, distinct ways: hydraulic input and mechanical input (lock-up converters only). Hydraulic input comes from a turbine (not shown in FIG. 1) associated with torque 104. The amount of input torque can vary depending on the operating conditions within the converter 104. Mechanical input results when the lock-up function of the converter 104 engages. The end result is better fuel economy because all converter 104 slippage is eliminated when the converter 104 locks. The torque converter 104 also help to "smooth out" engine power pulses, as does the flywheel on an automobile with a manual transmission.

A torque button 110 is also in contact with flexplate/target 106 and is integrated with torque rotating coupler portion 112. The flexplate/target 106 is also in contact with the transmission and torque converter 104. A torque sensor portion 111 and 113 is also connected and/or in contact with engine 102. Torque sensor portion 113 can be configured to include a crank sensor 116, which can be provided as part of an overall torque coupler package composed of torque sensor portions 111, 113 and/or torque coupler portions 112, 114. Note that the torque sensor portions 111, 113 can be located anywhere on or near the engine 102. That is, such torque sensors can be located at the front or back of engine 102 depending upon design considerations.

In the configuration depicted in FIG. 1, the crank sensor 116 can be implemented at the rear of engine or engine block 102, depending upon design considerations. Although only a crank sensor 116 is illustrated in FIG. 1, it can be appreciated that a cam sensor may be implemented in place of or in association with crank sensor 116. Thus, system 100 should not be considered as limited only to the use of a crank sensor, because a cam sensor may also be utilized. Flexplate/target 106 can be utilized as a torque sensor attachment member as well as the target for crank sensor 116. In a cam sensor arrangement (not depicted in FIG. 1), a cam sensor may utilize targets attached to a cam. The reverse situation of FIG. 1 may also be implemented such that cam and/or crank sensor 116 are mounted to the rear of engine 102. System 100 therefore provides an innovation based on the packaging technique and the use of flexplate/target 106 and one or more sensors into a single unit.

Torque sensor system 100 thus incorporates the use of a torque sensor (i.e., torque sensor portions 111, 113) in the same sensor package as a cam shaft position sensor and/or a crank shaft position sensor (e.g., crank sensor 116). The implementation of system 100 in the context of an automobile, for example, can reduce the overall sensor costs associated with the vehicle. The crank sensor 116 and torque sensor portion 113, for example, may be located in a spot nearby either the crank shaft 108 and/or a cam shaft (not shown in FIG. 1) that is associated with or forms a part of engine 102. The flexplate/target 106 is generally attached to crank shaft 108 (i.e., or a cam shaft) in the location that is nearest the torque sensor or crank sensor 116. In such a scenario, the crank shaft position sensor 116 and/or cam shaft position sensor can be incorporated into a torque sensor package and sense flexplate/target 106.

Figure 2:
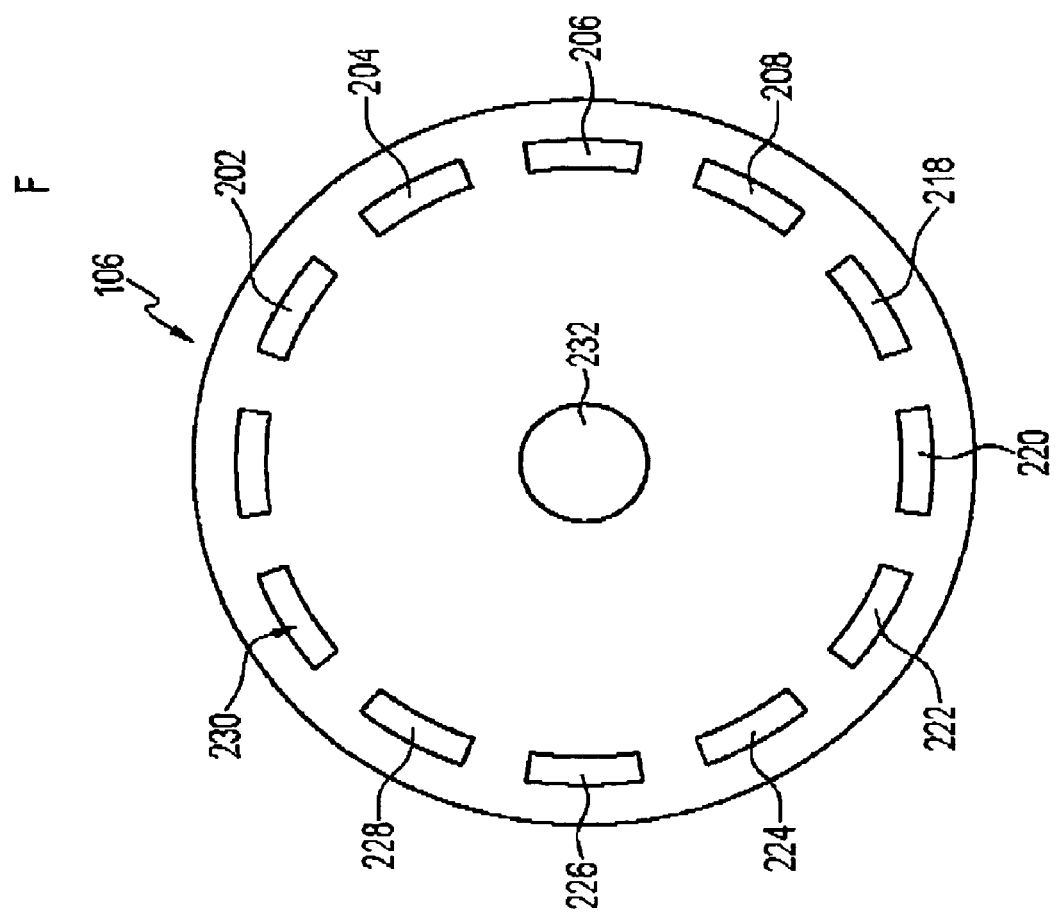
FIG. 2 illustrates a front view of a flexplate, which can be implemented in accordance with a preferred embodiment.

FIG. 2 illustrates a front view of the flexplate 106 illustrated in FIG. 1, which can be implemented in accordance with a preferred embodiment. Note that in FIGS. 1–3, like or identical parts or elements are generally indicated by identical reference numerals. Thus, flexplate 106 generally includes a plurality of slots 202, 204, 206, 208, 218, 220, 222, 224, 226, 228, and 230, which are provided for the crank sensor 116 depicted in 116 to sensor. FIG. 2 therefore depicts a more detailed view of the crank sensor 116 depicted in FIG. 1. Flexplate 106 also includes a central portion thereof.

In understanding the purpose of flexplate 106, it is important to appreciate that flexplate 106 is based on the concept of flywheels utilized in automatic transmission engines. The flywheel for most automatic transmissions/transaxles is simply a stamped-steel starter's pinion gear. With this type of flywheel, the torque converter has no ring gear. Some automobiles, however, utilize a more modest flywheel known as a flexplate, which is all that is generally required because the torque converter 104 itself may be configured to include a ring gear located on its outer edge.

The flywheel, or flexplate 106, thus mounts to crankshaft 108 of engine 102 and also serves as a mounting location for the torque converter 104. Consequently, the flywheel or flexplate 106 can transmit engine torque to the torque converter 104 and or the torque converter housing. The flywheel's ring gear can also serve as an engagement point for the pinion of the starter motor when cranking the engine 102. Because of the lightweight nature of the flywheel or flexplate 106, such a device does not assist in "smoothing out" power pulses from the engine 102 like the flywheel does on a car with a manual transmission. On cars with automatic transmissions, however, the torque converter 104 can provide this function.

Figure 3A:
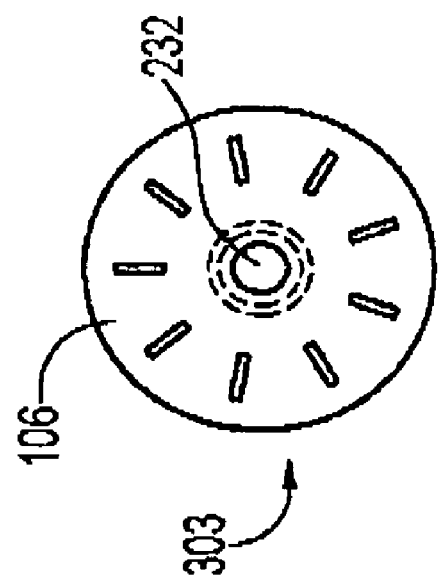
FIG. 3 illustrates a side sectional view of a torque sensor system, which can be implemented in accordance with an alternative embodiment.
Figure 3:
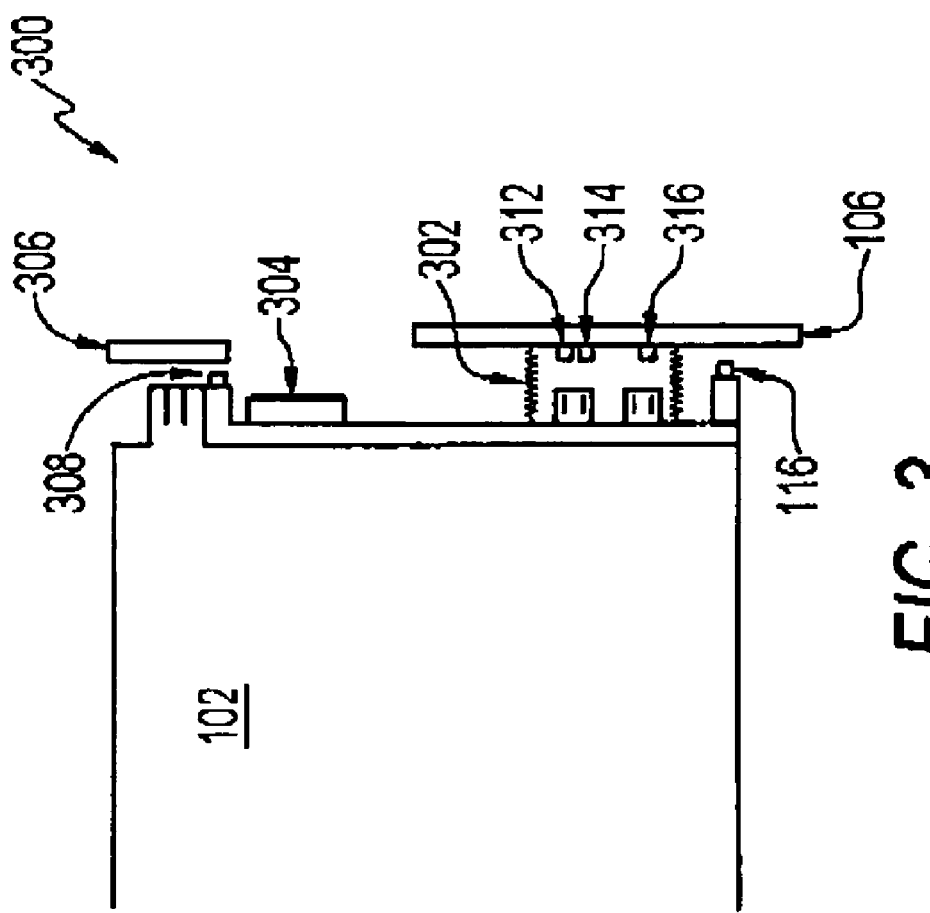

FIG. 3 illustrates a side sectional view of a torque sensor system 300, which can be implemented in accordance with an alternative embodiment. Note that some of the components depicted in FIGS. 1–2 are also depicted in FIG. 3. The torque sensor system 300 illustrated in FIG. 3 represents an alternative version of the system 100 depicted in FIG. 1. System 300 generally includes engine block 102, which is located opposite the flexplate 106. System 300 includes the use of the crank sensor 116 and a cam sensor 308. A smaller target 306 is located proximate to the cam sensor 308.

A gasket 302 is generally located between the flexplate 106 and the engine block 102. The cam sensor 302 is also located proximate to a "black box" 304, which can be utilized, for example, as a plug for cam or crank torque. A plurality of torque sensors 312, 314, 316 can also be provided, which are attached to flexplate 106. Torque sensors 312, 314, and 316 can be implemented with coupler or antennas for the wireless transmission of torque sensor data detected by torque sensors 312, 314, and 316. Note that FIG. 3 also illustrates a front view 303 of flexplate 106, including the central portion 232 of flexplate 106.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A torque sensor system, comprising:
   an engine located opposite a torque converter, wherein a shaft extends from said engine and interacts with said torque converter;
   a target located between said engine and torque converter, wherein said target comprises a flexplate that is mounted to said shaft and serves as a mounting location for said torque converter; and
   at least one torque sensor attached to said flexplate and integrated with at least one position sensor for detecting a position associated with said shaft, wherein said at least one torque sensor and said at least one position sensor are integrated into a single torque sensor package to thereby provide enhanced sensing of said target in association with a rotation of said shaft during an actuation of said engine.

2. The system of claim 1 further comprising a gasket located between said flexplate and an engine block associated with said engine.

3. The system of claim 1 wherein said shaft comprises a crank shaft.

4. The system of claim 1 wherein said at least one position sensor comprises a crank shaft sensor.

5. The system of claim 1 wherein said target comprises a flywheel.

6. The system of claim 5 wherein said flexplate is configured to include a plurality of slots formed therein that are detectable by said at least one position sensor.

7. The system of claim 1 wherein said engine is associated with an automatic transmission.

8. The system of claim 7 further comprising a plurality of torque rotating couplers connected to said target, wherein said plurality of torque rotating couplers provide for a wireless transmission of torque data detected by said at least one torque sensor.

9. A torque sensor system, comprising:
   an engine associated with an automatic transmission, wherein said engine is located opposite a torque converter, such that a crank shaft extends from said engine and interacts with said torque converter;
   a flexplate located between said engine and torque converter, wherein said flexplate is mounted to said shaft and serves as a mounting location for said torque converter; and
   at least one torque sensor attached to said flexplate and integrated with at least one crank shaft position sensor for detecting a position associated with said crank shaft; and
   a plurality of torque rotating couplers connected to said target, wherein said plurality of torque rotating couplers provide for a wireless transmission of torque data detected by said at least one torque sensor, wherein said at least one torque sensor and said at least one crank shaft position sensor are integrated into a single torque sensor package to thereby provide enhanced sensing of said flexplate in association with a rotation of said crank shaft during an actuation of said engine.

10. The system of claim 9 wherein said flexplate is configured to include a plurality of slots formed therein that are detectable by said at least one position sensor.

11. The system of claim 10 wherein said plurality of torque rotating couplers connected to said target comprise antennas for said wireless transmission of said torque data detected by said at least one torque sensor.

12. A torque sensor method, comprising:
    locating an engine opposite a torque converter, wherein a shaft extends from said engine and interacts with said torque converter;
    providing a target between said engine and torque converter, wherein said target comprises a flexplate that is mounted to said shaft and serves as a mounting location for said torque converter; and
    integrating at least one torque sensor with at least one position sensor for detecting a position associated with said shaft, wherein said at least one torque sensor is attached to said target and integrated with said at least one position sensor into a single torque sensor package to thereby provide enhanced sensing of said target in association with a rotation of shaft during an actuation of said engine.

13. The method of claim 12 further comprising configuring said shaft to comprise a crank shaft.

14. The method of claim 13 further comprising providing said position sensor as a crank shaft sensor.

15. The system of claim 12 further comprising configuring said flexplate to include a plurality of slots formed therein that are detectable by said at least one position sensor.

16. The method of claim 12 further comprising associating said engine with an automatic transmission.

17. The method of claim 12 further comprising connecting a plurality of torque rotating couplers to said target, wherein said plurality of torque rotating couplers provide for a wireless transmission of torque data detected by said at least one torque sensor.

* * * * *